Figure 1:
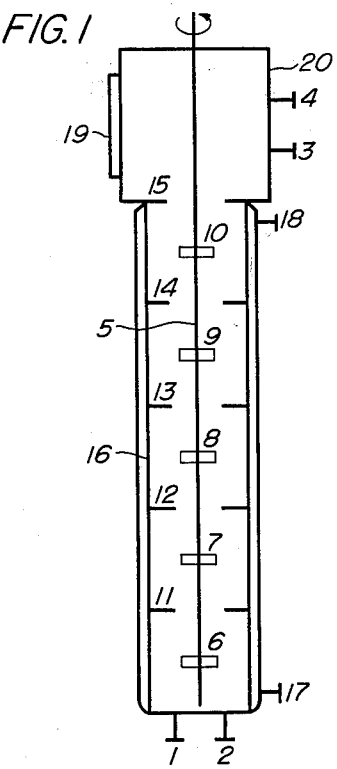

Dec. 8, 1964 SHINICHIRO TERAO ETAL 3,160,669
EMULSION PROCESS OF PRODUCING AROMATIC NITRO COMPOUNDS
Filed April 13, 1962

Shinichiro Terao
Tadashi Hinago
INVENTORS

BY Stevens, Davis, Miller & Mosher
ATTORNEYS

United States Patent Office 3,160,669
Patented Dec. 8, 1964

3,160,669
EMULSION PROCESS OF PRODUCING AROMATIC NITRO COMPOUNDS
Shinichiro Terao and Tadashi Hinago, both of Tsurusaki-shi, Japan, assignors to Sumitomo Chemical Company, Ltd., Higashi-ku, Osaka, Japan, a corporation of Japan
Filed Apr. 13, 1962, Ser. No. 187,248
11 Claims. (Cl. 260—645)

The present invention relates to a process for continuously producing aromatic nitro compounds, and also to an apparatus suitable for carrying out the process.

Most of the conventional processes for nitrating aromatic compounds, such as benzene, toluene, chlorobenzene and the like, with a mixed acid comprising nitric acid and sulfuric acid, are of the batch system. Some attempts for the continuous process have been made, because of its economical advantage. Up to the present, however, fully satisfactory continuous nitration processes have not yet been established. Hitherto, such a continuous process has been proposed, wherein two or three sequential reaction vessels are employed. In the first vessel an aromatic hydrocarbon to be nitrated and a mixed acid for the nitration, are continuously charged and allowed to react together in emulsion with vigorous stirring by a powerful driving force. The resultant liquid is subjected to the second and the third nitration treatments in the subsequent vessels, and then the reaction mass is transferred to a separator wherein it is allowed to separate into two layers of the nitrated product and the spent acid. In such conventional process, however, there are some difficulties, such as the difficult maintenance of the emulsion of the reaction mass with uniformity throughout all the sites in the vessels and with constancy throughout the operation time, and the complex construction of the apparatus. Thus, the difficult maintenance of the emulsion of the reaction mass causes the deleterious effects to the quality of the final product. The complex construction of the apparatus makes its administration and repair difficult, thereby sometimes causing accidents, such as explosion.

It is an object of the invention to provide a novel process of continuously nitrating aromatic compounds, which can yield higher quality of the nitro compounds with easier operation control, with economical advantage, with lower cost of investment, and with the safety of the operation. It is another object of the invention to provide an apparatus suitable for carrying out the process as above mentioned. Other objects and advantages of the invention will be apparent from the following description.

According to the process of the invention, a process for continuously producing aromatic nitro compounds is provided, which comprises charging, into one end of a reaction zone which is composed of a plurality of compartments, a mixture of an aromatic compound, selected from the group consisting of aromatic hydrocarbons and chlorinated and nitrated compounds thereof, with a part of the nitrated product; charging a mixed acid comprising nitric acid and sulfuric acid into the reaction zone at least at one compartment at any stage, thereby the reaction mixture being transferred through the compartments subsequently while being kept in emulsion with agitation at every compartment; allowing the nitrated reaction mass to separate into two layers of organic phase composed of the nitrated product and spent acid phase in a separating zone adjacent to the other end of the reaction zone; taking out the nitrated product and the spent acid separately; and recycling a part of the nitrated product to be combined with said aromatic compound.

According to the process of the invention, further, a process for continuously producing aromatic nitro compounds is provided, which comprises charging, into one end of a first reaction zone which is composed of a plurality of compartments, a mixture of an aromatic compound, selected from the group consisting of aromatic hydrocarbons and chlorinated and nitrated compounds thereof, with a part of the nitrated organic phase obtained in the first nitration step, charging a mixed acid comprising nitric acid and sulfuric acid into the reaction zone at least at one compartment at any stage, thereby the reaction mixture being transferred through the compartments subsequently while being kept in emulsion with agitation at very compartment and while being kept at a temperature, and whereby a major part of the aromatic compound being nitrated; allowing the nitrated reaction mass to separate into two layers of nitrated organic phase and partially spent acid phase in a separating zone adjacent to the other end of the first reaction zone; withdrawing the nitrated organic phase and the partially spent acid separately; recycling a part of the nitrated organic phase to be combined with said aromatic compound; charging, into one end of a second reaction zone which is composed of multiple compartments, a mixture of the remainder of the nitrated organic phase with the nitrated product obtained in the second nitration step and the partially spent acid separately, thereby the reaction mixture being transferred through the compartments in the second reaction zone while being kept in emulsion with agitation at every compartment and while being kept at a temperature higher than the temperature employed in the first step, whereby a substantial part of the aromatic compound is being nitrated; allowing the nitrated reaction mass to separate into two layers of nitrated compound phase and spent acid phase in another separating zone adjacent to the other end of the second reaction zone; taking out the nitrated product and the spent acid separately; and recycling a part of the nitrated product to be combined with said nitrated organic phase charged into the second reaction zone.

Furthermore, an apparatus for the continuous nitration of aromatic hydrocarbons which is suitable for carrying out the process as mentioned above, according to the invention, is provided, which apparatus comprises a reactor which is sectioned into plurality of compartments by baffle plates, which has an inlet for charge of the aromatic compound at one end of the reactor and which has at least one inlet for charge of a mixed acid comprising nitric acid and sulfuric acid at least at one compartment at any stage; agitating means provided in each compartment of the reactor; cooling means provided to adjust the temperature in the reactor; a separator connected to the other end of the reactor wherein the product is separated into the two layers of the nitrated compound phase and the spent acid phase and having outlets for withdrawal of each of the phases.

Figure 2:
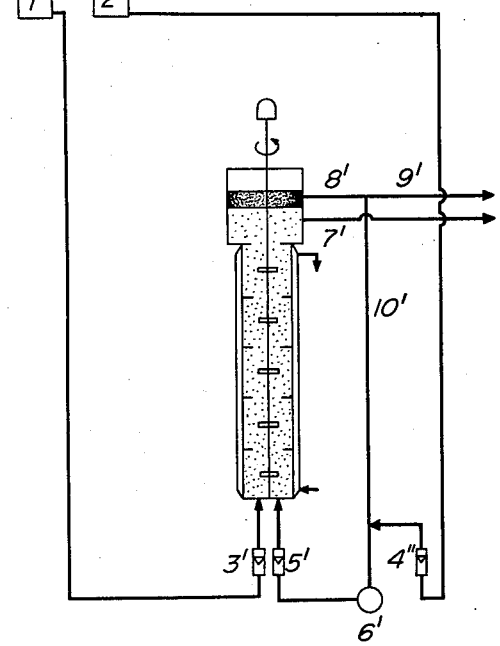
Figure 3:
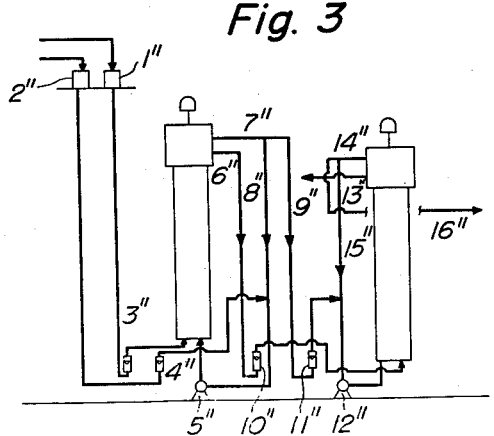

In the accompanying drawings, FIGURE 1 shows a schematic view of a longitudinal section of one example of the nitration apparatus of the invention; and FIGURES 2 and 3 illustrate diagrammatically the process of the invention.

In FIGURE 1, 1 and 2 show inlets of the charges of an aromatic compound to be nitrated and a mixed acid comprising nitric acid and sulfuric acid, respectively, through which said charges are introduced into the reaction zone at the constant rates. The reaction zone is sectioned into plurality of compartments by baffle plates, 11, 12, 13, 14 and 15, each of which has a hole at the center and is installed at the inside wall of the reactor. The agitating blades located at every compartment are shown as 6, 7, 8, 9 and 10, which are fixed on a stirrer shaft passing through the reactor, preferably with the same intrablade distance. The length of the blade may be equal to or larger or smaller than the diameter of the hole of the plate, and the liquid reaction mass is transferred upwardly through the holes of the plates in a steady state. In some cases, the reactor may be constructed which is composed of plurality of compartments sectioned by baffle plates and in which each individual agitating means is provided in each of the compartments. The charges fed at the bottom of the lowest compartment are transferred toward the upper compartments in subsequent order, while being subjected to stirring in each compartment.

A separating room or separator 20 is mounted at the top of the reaction zone, and has preferably a larger diameter than that of the reaction zone. In the separator, the reaction mixture transferred from the reaction zone is allowed to separate into two phases of the nitrated organic phase and the spent acid phase according to the difference of their specific gravities. In FIGURE 1, 4 shows an outlet of the nitrated organic phase and 3 shows an outlet of the spent acid. 19 shows a sight glass, through which a boundary layer between the separated phases can be observed. 16 shows a water jacket, in which cooling water is fed from the inlet 17 and withdrawn from the outlet 18. Internal and/or external cooling equipment may be used instead of, or in combination with, the jacket. The reaction heat generating is removed off by means of the above cooling medium, and the liquid reactants are maintained at a desired and conventionally known constant temperature between about 30° C. and 80° C., depending upon the kind of the material to be nitrated.

According to the present apparatus, the continuous nitrating reaction of aromatic compounds with a mixed acid or a nitric acid-sulfuric acid mixture are always effected smoothly and uniformly. The aromatic compounds and the mixed acid are charged at the lowest portion of the reactor at constant rates. They react together uniformly while being transferred through the subsequent compartments with efficient agitation in each compartment, and finally the nitrated product is continuously sent to the separator.

Thus, the composition of the reaction mixture in each reaction compartment of the reactor is always constant. The reaction proceeds at the constant rate, and the resultant nitro compound and the spend acid are withdrawn from the separator at a constant rate.

The baffle plate may be a perforated plate of the diameter equal to the inner diameter of the reactor. Any type of perforated plates may be employed, such as those having one hole at the center or having a number of small holes along the surface. Alternatively, the plate may be grid type or screen type.

The number of the compartments may be selected arbitrarily, but, ordinarily, three to ten or more of compartments is employed.

As illustrated in FIGURE 1, the inlet pipe for the charge of the mixed acid may be located at the bottom of the reactor. In some cases, if desired or required, the inlet pipe may be located at any stage of the compartments, for example, at the middle stage. Moreover, two or more of inlet pipes for the charge of the mixed acid may be equipped at any stage of the compartments, for example, at the bottom and the middle stage.

Referring to FIGURE 2 of the accompanying drawings which illustrates a cycling system of the present process using the nitration apparatus as set forth in FIGURE 1, the desired nitrated product is taken off through the pipe 8' and divided into two parts. A part of the product is withdrawn through the pipe 9', while the other part of the compound is recycled to the reactor through the circulating pipe 10', at the way of which is connected to the charging line for the material compound. Accordingly, the aromatic compound charge is always fed in combination with the nitrated product. In FIGURE 2, 1' and 2' show the mixed acid feeding tank and the aromatic compound feeding tank, respectively. 3', 4' and 5' show flowmeters, and 6' shows a circulating pump, and 7' shows a spent-acid-withdrawing pipe. As the fresh charge of the aromatic compound to be nitrated is introduced in the reactor along with a part of the nitrated product, the reaction mixture in the lowest compartment of the reactor is extremely uniform and smooth.

In this method, as the reaction mixture in the lowest compartment of the reaction zone contains an aromatic compound to be nitrated, in combination with the nitrated product, the concentration of the aromatic compound in the reaction mixture is lower than that in which no nitrated product is admixed, besides, the nitrated product serves for the emulsification of the reaction mixture. Thus, the reaction proceeds mildly and is not accompanied by higher nitro compounds by-produced, in contrast to the vigorous exothermic reaction in case of directly mixing an aromatic compound containing no nitrated product and a mixed acid as in the conventional processes.

As mentioned above, the mixed acid may be charged through an inlet pipe equipped at the bottom, or at any stage. In some cases, it may be charged through two or more inlet pipes equipped at any stage of the compartments. When it is charged, for example, through two pipes, one being equipped at the bottom and the other being approximately at the middle stage of the compartments, a better uniformity in the temperature, as well as in the acid concentration, is secured, which makes the by-production of the higher nitro compound minimize.

The amount of the circulation can be selected within a broader range. The apparatus and the process of the invention provide much advantages over the conventional nitration apparatus and processes, even in the extreme case where no circulation is effected. However, the effectiveness of the present apparatus and process are much higher by employment of the circulation system, as mentioned above. The proportion of the weight of the circulating nitrated product per weight the product taken out may be 0 to as much as about 500, preferably about 1 to 200.

Further, this present invention can be more effectively carried out by employing two or more of the above-mentioned reactors in combination. This will be illustrated in FIGURE 3 of the accompanying drawings. In FIGURE 3, 1" and 2" are the mixed acid feed tank and the aromatic compound feed tank, respectively, from which the mixed acid and the aromatic compound are introduced into the bottom of the first reactor. The aromatic compound is continuously nitrated by the mixed acid while it is passed through the first reactor as described in the FIGURES 1 and 2. The resultant reaction product in the first reactor is withdrawn through the nitrated organic phase outlet 7", while the partially spent acid phase is withdrawn through the spent acid outlet 6". A portion of the nitrated organic phase is recycled through a circulating pipe 8" to the first reactor along with the feed aromatic compound fed from the feed tank 2". The balance of the nitrated organic phase from the first apparatus is transferred to the second reactor through the pipe 9". The partially spent acid withdrawn from the first reactor is introduced to the second reactor through the partially spent acid pipe 6". In the second reactor, the nitrated organic phase and the partially spent acid from the first reactor react with each other, similarly as in the first reactor. A portion of the nitrated compound withdrawn through the outlet pipe 14" in the second reactor is recycled to the lower part of the second reactor through circulating pipe 15". The balance of the nitrated compound is withdrawn through the outlet pipe 16". The spent acid in the second reactor is taken out through the outlet pipe 13". In the figure, 3", 4", 10" and 11" show flowmeters, and 5" and 12" show circulating pumps.

In the process as shown in FIGURE 3, the first reactor treats a mixture of a feed aromatic compound and its nitrated product along with the feed mixed acid. Thus the reaction can be proceeded with extreme mildness and uniformity, when compared with the case where merely an aromatic compound and a mixed acid are introduced.

In this two step nitration, it is advantageous to effect the nitration at the first reactor up to about 90–98%, and to substantially complete the remainder of the nitration at the second reactor. If a substantially complete nitration is contemplated in one reactor, raising the reaction temperature will be required, which, however, may decrease the yield of the objective nitro compound because of the by-production of undesirable higher nitro compounds. Thus, a higher yield of nitration is attained by use of the reactors and the process of the reaction of the invention in two stages. For that purpose, it is necessary to employ a temperature in the second reactor higher than that in the first reactor, for example, about 3° to 20° C., preferably 5° to 15° C., higher temperature.

In this two step nitration, the mixed acid may be introduced to the reaction zone of the first reactor at least at one compartment at any stage. Thus, the mixed acid may be introduced, for example, from the middle stage, or from the middle and the bottom stages. In some cases if desired, the partially spent acid to be introduced into the second reactor may be combined with a fresh mixed acid prior to the introduction, so as to reinforce the power of the acid.

The nitrated product yielded according to the process of the invention, either of one step or two step nitration, has an exceedingly superior quality. The product contains much less level of higher nitro compound by-products than those obtained in the conventional processes. Accordingly, the product withdrawn from the separator in the reactor can, in some cases, be employed per se as the raw material for various production processes. When a further purification is desired, the product may be subjected to such procedures, as washing with water, dehydration or drying, and distillation in vacuo.

The aromatic compound which can be nitrated according to the present invention is selected from the group consisting of aromatic hydrocarbons and chlorinated and nitrated compounds thereof. Thus, benzene, toluene, chlorobenzene, and the like, can be nitrated to yield the corresponding mononitro compounds, while, nitrobenzene, nitrotoluene, and the like, can be nitrated to yield the corresponding dinitro compounds.

The mixed acid used in the present invention may have any composition comprising nitric acid and sulfuric acid, which is employed for the mixed acid-nitration process in general. The typical and preferable composition of the mixed acid is, however, within the ranges of 30% to 50% of nitric acid, 50% to 60% of sulfuric acid, and 5% to 15% of water. The spent acid withdrawn from the separator contains sulfuric acid and a little amount of nitric acid, which may be reused for make-up of the fresh mixed acid after removal of any organic contaminants.

The amount of the mixed acid charged to the reaction zone, based upon the amount of the aromatic compound material, is freely selected according to the knowledge in the conventional nitration process, but an amount of about 1 to 3 times by weight per amount of the aromatic compound is preferable in general.

The process for continuously producing aromatic compounds, according to the invention, will be more fully illustrated with reference to the following examples, which are, however, set forth merely by way of illustration and not by way of limitation.

*Example 1*

Benzene was mono-nitrated, using the nitration apparatus shown in FIGURE 1. Benzene and a mixed acid comprising nitric acid and sulfuric acid (33% by weight of nitric acid) were continuously introduced to the bottom of the reactor at the rates of 12 kg./day and 30 kg./day, respectively, and the product was continuously withdrawn from the separator. The reaction zone was kept at 40° C., and the stirrer was rotated at 300 r.p.m. The reaction ratio, namely the yield, was 96% to 98%.

*Example 2*

Toluene was mono-nitrated, as in Example 1. Toluene and the mixed acid same as that in Example 1 were continuously introduced to the bottom of the reactor at the rates of 20 kg./day and 41.6 kg./day, respectively, and the product was continuously withdrawn from the separator. The reaction zone was kept at 40° C., and the stirrer was rotated at 300 r.p.m. The reaction ratio, namely the yield, was 96% to 98%.

*Example 3*

Chlorobenzene was mono-nitrated, as in Example 1. Chlorobenzene and the mixed acid same as that in Example 1 were continuously introduced to the bottom of the reactor at the rates of 18 kg./day and 30.6 kg./day, respectively, and the product was continuously withdrawn from the separator. The reaction zone was kept at 60° C., and the stirrer was rotated at 300 r.p.m. The reaction ratio, namely the yield, was 96% to 98%.

*Example 4*

Benzene was mono-nitrated, using the reaction apparatus as shown in FIGURE 2. Benzene and the mixed acid same as that used in Example 1 were introduced to the bottom of the reactor at the rates of 12 kg./day, and 30 kg./day, respectively. The reaction zone was kept at 40° C., and the stirrer was rotated at 300 r.p.m. A part of the produced nitro-benzene was recycled at the rate of 2.5 liter/min. The reaction yield was 98%, and 18.2 kg./day of nitrobenzene was obtained.

*Example 5*

Toluene was mono-nitrated, as in Example 4. Toluene and the mixed acid same as that used in Example 1 were introduced to the bottom of the reaction apparatus at the constant rates of 20 kg./day, and 41.6 kg./day, respectively. The temperature in the reactor was kept at 40° C., the stirrer rotated at 300 r.p.m., and a part of the produced nitrotoluene was recycled at the rate of 1 liter/min. The reaction yield was 98%, and 28.5 kg./day of nitrotoluene was obtained.

*Example 6*

Chlorobenzene was mono-nitrated, as in Example 4. Chlorobenzene and the mixed acid same as that used in Example 1 were introduced to the bottom of the reaction apparatus at the constant rates of 18 kg./day and 30.6 kg./day, respectively. The temperature of the reactor was kept at 60° C., the stirrer rotated at 300 r.p.m. and the produced chloronitrobenzene was recycled to the reactor at the rate of 2 liters/min. The reaction yield was 98% and 24.5 kg./day of chloronitrobenzene was obtained.

*Example 7*

Benzene was mono-nitrated, using the reaction apparatus shown in FIGURE 3. Benzene and the mixed acid same as that used in Example 1 were introduced to the bottom of the first reactor at the rates of 79.2 kg./day and 197 kg./day, respectively. The temperatures of the first and the second reactors were kept at 40° C., and 50° C., respectively, rotating the stirrers at 300 r.p.m. A part of the produced nitrobenzene were recycled at the rate of 2.5 liters/min., in each reactor. The reactions in the first reactor was 94%, and that in the second 99%. 120 kg./day of nitrobenzene was finally obtained.

*Example 8*

Toluene was mono-nitrated, as in Example 7. Toluene and the mixed acid same as that used in Example 1 were introduced to the bottom of the first reactor at the rates of 132 kg./day and 274 kg./day, respectively. The temperatures of the first and the second reactors were kept at 35° C. and 40° C., respectively, the stirrers rotated at 300 r.p.m., and a part of the produced nitrotoluene was recycled to the first and to the second reactors at the rates of 2.0 liters/min. and 1 liter/min. respectively. The reactions in the first and in the second reactors were 93% and 98%, respectively. 188 kg./day of nitrotoluene was finally obtained.

*Example 9*

Chlorobenzene was mono-nitrated, as in Example 7. Chlorobenzene and the mixed acid same as that used in Example 1 were introduced to the bottom of the first reactor at the rates of 118 kg./day and 200 kg./day, respectively. The temperature of the first and the second reactors were kept at 45° C. and 60° C., respectively, the stirrers rotated at 300 r.p.m., and a part of the produced chloronitrobenzene was recycled at the rates of 2 liters/min. in each reactor. The reactions in the first and the second reactors were 90% and 98%, respectively, and 160 kg./day of chloronitrobenzene was obtained.

We claim:

1. A process for continuously producing aromatic nitro compounds which comprises: charging into the lower end of a reaction zone which is composed of a plurality of compartments arranged vertically a mixture of an aromatic compound, selected from the group consisting of aromatic hydrocarbons and chlorinated and nitrated compounds thereof, with a part of the nitrated product resulting from the hereinafter described nitration of said aromatic compound; charging a mixed acid comprising nitric acid and sulfuric acid into at least at one compartment of said reaction zone agitating the reaction mixture being transferred through the compartments so as to keep it in emulsion with agitation in each of the compartments; allowing the nitrated reaction mass to separate into two layers, a first layer consisting of organic phase composed of the nitrated product and a second layer consisting of a spent acid phase in a separating zone adjacent to the upper end of the reaction zone; recovering the nitrated product and the spent acid separately; and returning and mixing a part of the nitrated product with said aromatic compound being charged into said reaction zone.

2. A process according to the claim 1, wherein the mixed acid is charged into the same compartment as that into which the aromatic compound is charged.

3. A process according to the claim 1, wherein said aromatic compound is benzene.

4. A process according to the claim 1, wherein said aromatic compound is toluene.

5. A process according to the claim 1, wherein said aromatic compound is chlorobenzene.

6. A process for continuously producing aromatic nitro compounds which comprises: charging into the lower end of a first reaction zone which is composed of a plurality of compartments arranged vertically a mixture of an aromatic compound, selected from the group consisting of aromatic hydrocarbons and chlorinated and nitrated compounds thereof, with a part of the nitrated organic phase obtained in the first nitration step hereinafter described; charging a mixed acid comprising nitric acid and sulfuric acid into at least one compartment of said reaction zone, agitating the reaction mixture being transferred through the compartments so as to keep it in emulsion with agitation in each of the compartments and while being kept at a temperature, between about 30° C. and 80° C., whereby a major part of the aromatic compound is nitrated; allowing the nitrated reaction mass to separate into two layers a first layer consisting of nitrated organic phase and a second layer consisting of partially spent acid phase in a separating zone adjacent to the upper end of the first reaction zone, withdrawing the nitrated organic phase and the partially spent acid separately; recycling a part of the nitrated organic phase and mixing same with said aromatic compound; separately charging, into the lower end of a second reaction zone which is composed of multiple vertically arranged compartments, a mixture of the remainder of the nitrated organic phase with the nitrated product obtained in the second nitration step hereinafter described and the partially spent acid, transferring the reaction mixture through the compartments in the second reaction zone while being kept in emulsion with agitation in each of the compartments and while being kept at a temperature which is about 3° to 20° C. higher than the temperature employed in the first reaction zone, whereby substantially all of the aromatic compound is nitrated; allowing the nitrated reaction mass to separate into two layers a first layer consisting of nitrated compound phase and a second layer consisting of spent acid phase in another separating zone adjacent to the upper end of the second reaction zone; taking out the nitrated product and the spent acid separately; and recycling a part of the nitrated product and mixing same with said nitrated organic phase charged into the second reaction zone.

7. A process according to the claim 6, wherein the mixed acid is charged into the same compartment of the first reactor as that into which the aromatic compound is charged.

8. A process according to the claim 6, wherein said aromatic compound is benzene.

9. A process according to the claim 6, wherein said aromatic compound is toluene.

10. A process according to the claim 6, wherein said aromatic compound is chlorobenzene.

11. A process according to the claim 6, wherein about 90% to 98% of the aromatic compound is nitrated at the first reaction zone, and the temperature in the second reaction zone is between about 3 and 20° C. higher than the temperature employed in the first reaction zone.

References Cited by the Examiner

UNITED STATES PATENTS

| | | | |
|---|---|---|---|
| 2,684,287 | 7/54 | Seavey | 23—266 |
| 2,951,746 | 9/60 | Kouba et al. | 23—266 |
| 3,000,972 | 9/61 | Bonetti | 260—645 |
| 3,034,867 | 5/62 | Samuelsen | 23—266 |
| 3,049,570 | 8/62 | Plummer | 260—645 |
| 3,053,908 | 9/62 | Kouba et al. | 260—645 |

FOREIGN PATENTS

| | | |
|---|---|---|
| 126,355 | 5/19 | Great Britain. |
| 40,964 | 2/10 | Austria. |

CARL D. QUARFORTH, *Primary Examiner.*

LEON D. ROSDOL, OSCAR R. VERTIZ, *Examiners.*